United States Patent [19]

Chen et al.

[11] Patent Number: 5,099,408
[45] Date of Patent: Mar. 24, 1992

[54] SYSTEM FOR CONTROLLING A PWM INVERTER HAVING DELAY TIME COMPENSATION

[75] Inventors: Guo Cheng Chen, Shanghai, China; Yukio Kawa, Hachioji, Japan

[73] Assignee: Kasuga Denki Kabushiki Kaisha, Tokyo, Japan

[21] Appl. No.: 515,564

[22] Filed: Apr. 27, 1990

[30] Foreign Application Priority Data

May 23, 1989 [JP] Japan .................................. 1-129946

[51] Int. Cl.⁵ ......................................... H02M 7/5395
[52] U.S. Cl. ..................................... 363/41; 318/811; 363/56
[58] Field of Search ...................... 363/41, 56; 318/811

[56] References Cited

U.S. PATENT DOCUMENTS

| | | | |
|---|---|---|---|
| 4,523,268 | 1/1985 | Brajder et al. | 363/41 |
| 4,719,400 | 1/1988 | Kurakake et al. | 318/811 |
| 4,739,465 | 4/1988 | Asano et al. | 363/41 |

FOREIGN PATENT DOCUMENTS

| | | | |
|---|---|---|---|
| 36177 | 3/1983 | Japan | 363/41 |
| 106176 | 4/1990 | Japan | |

Primary Examiner—William H. Beha, Jr.
Attorney, Agent, or Firm—Stevens, Davis, Miller & Mosher

[57] ABSTRACT

A system is provided for controlling a PWM inverter having three main circuit arms in which free-wheel diodes are connected in parallel to positive and negative side switching elements. The inverter takes three phase alternating current from an intermediate portion of the arms on the basis of a voltage supply of a direct current and an ON and OFF operation of the switching elements. The control system includes a circuit for detecting a zero-crossing point of the three phase alternating current. A wave generating circuit generates a PWM wave at every main circuit arm, which changes the level thereof corresponding to ON and OFF operation of the switching elements and is inverted to each other in the positive and negative sides. An on-delay circuit delays a level change timing from ON to OFF of the PWM wave for a short circuit preventing duration. A compensation circuit compensates the PWM wave width of one phase in which a current opposite to other phases flows by expanding and contracting the width at the rate of two times as the short-circuit preventing duration. The expanded and contracted pulse width is added to the on-delay circuit, thereby controlling the switching elements of the inverter main circuit.

3 Claims, 5 Drawing Sheets

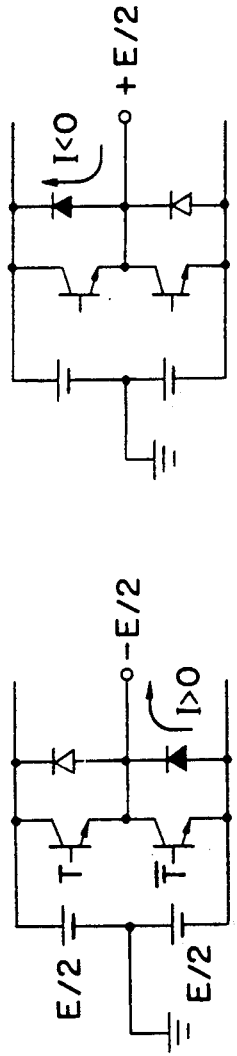
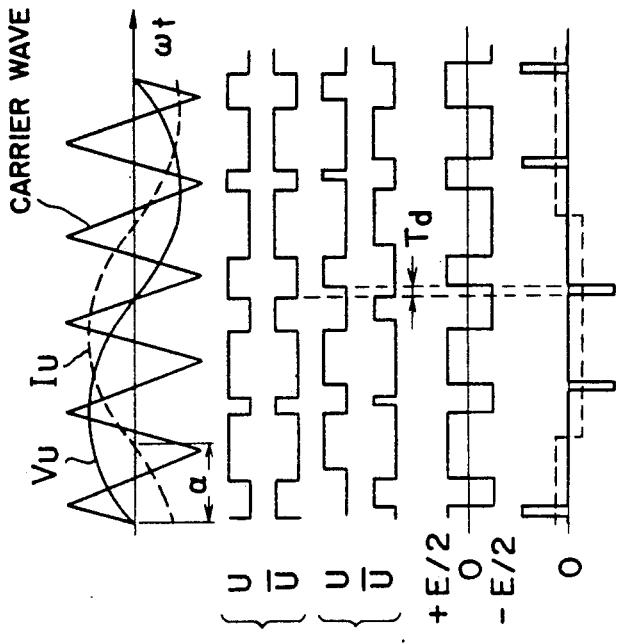

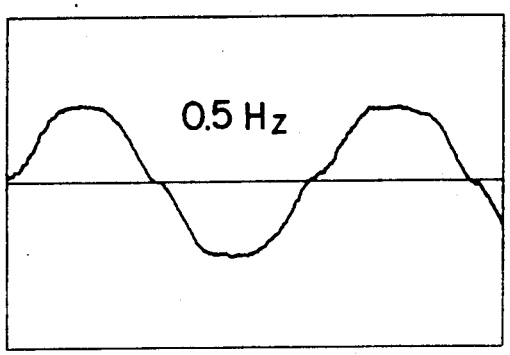
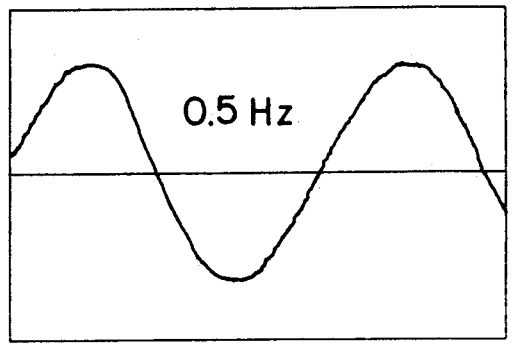
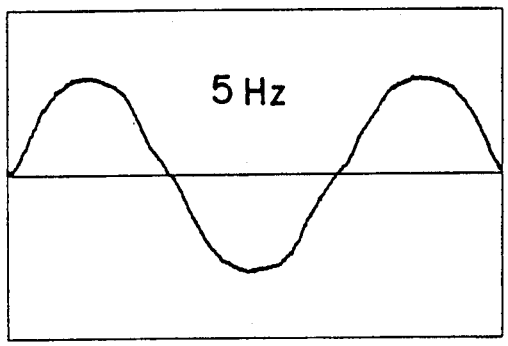
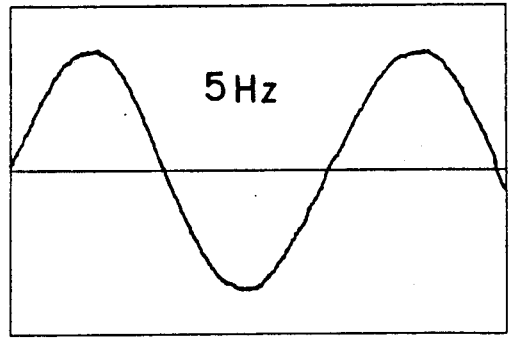
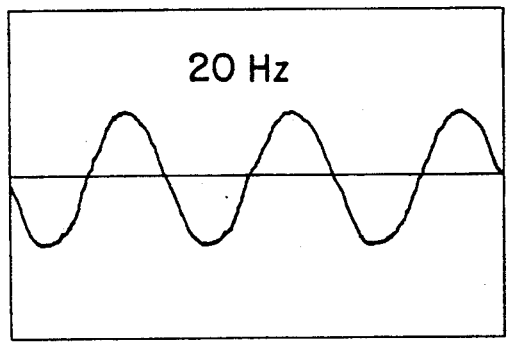
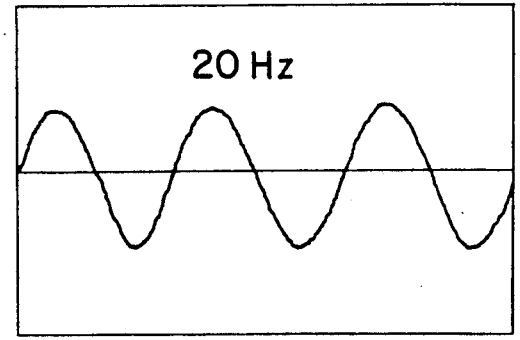
BEFORE COMPENSATION OF $T_a$
INFLUENCE OF $T_d$ AFTER COMPENSATION
FIG. 7(a)
FIG. 7(b)

INFLUENCE OF Td IN CASE
OF HIGH CARRIER FREQUENCY

INFLUENCE OF Td IN CASE
OF THREE PHASE CURRENT

INPULSE TRAIN TO BE ADDED

INFLUENCE OF Td AFTER
COMPENSATION

SYSTEM FOR CONTROLLING A PWM INVERTER HAVING DELAY TIME COMPENSATION

BACKGROUND OF THE INVENTION

The present invention relates to a system for an inverter in which free wheel diodes are respectively connected in parallel to switching elements of positive and negative sides comprising a main circuit arm, and more particularly to a system for an inverter for effectively supressing a voltage drop and a waveform distortion caused by providing a duration for short-circuit prevention.

Inverters of a pulse width modulation (abbreviated PWM hereinafter) voltage type fundamentally operate to turn on one of the positive and negative switching elements of each phase and to turn off the other switching element. The inverters of this kind actually prevent a short-circuit of arms caused by a switching time-lag in the manner of providing a short-circuit preventing duration $T_d$ and turning off both the switching elements of the positive and negative sides at the same time during the duration $T_d$. However, because the duration $T_d$ is an uncontrollable period when both switching elements turn off at the same time, an electric potential of an output terminal is determined by polarities of the current flowing through free wheel diodes.

FIG. 1 shows the aforementioned principle. If both switching elements of the positive and negative sides are turned off when a voltage E of a direct current (DC) power supply, in which a midpoint is grounded, is supplied to both ends of the arms, and when an output current I flows in the positive direction, a voltage of a terminal is "$-E/2$". On the contrary, if both switching elements are turned off when the current I flows in the negative direction, the voltage of the terminals is "$+E/2$".

As the short-circuit preventing duration $T_d$ is set at a constant period in this case, a constant voltage component having a rectangular waveform is superposed upon an output voltage, thereby reducing the output voltage in the region of the superposition and generating a waveform distortion of the output voltage. The reduction and distortion are described by using FIG. 2.

Namely, as shown in FIG. 2(a), when a current $I_u$ is supposed to flow through a load, a voltage $V_u$ is compared with a carrier wave. A phase of the current $I_u$ is delayed to the output voltage $V_u$ of U phase in a period $\alpha$. PWM pulses U and $\overline{U}$ are generated to be supplied to the switching elements of the positive and negative sides as shown in FIG. 2(b). Each rising of the PWM pulses U and $\overline{U}$ is respectively delayed in the short-circuit preventing duration $T_d$, to therefore control the switching elements to be turned on or off by the actual PWM pulses as shown in FIG. 2(c).

Accordingly, a voltage as indicated in FIG. 2(e) is superposed upon a waveform of the output voltage by providing the short-circuit preventing duration $T_d$, so that an actual voltage as shown in FIG. 2(d) is output. Namely, as indicated by a dotted line in FIG. 2(e), the above state corresponds to the situation where the synchroneous voltage of the output current $I_u$ is superposed upon the sine wave. For example, the higher the power factor and the carrier frequency become by increase of a load, the lower the output voltage $V_u$ becomes, thereby resulting in creation of waveform distortion.

In this connection, when the motor is driven in a low speed region which is a low level of the output voltage, there are influences as follows:

1) an instability phenomenon at a light-load is promoted;
2) an output torque is reduced by deterioration of the voltage according to a rise of the power factor;
3) a rotation ripple increases according to an increase of the waveform distortion of the output voltage.

In order to solve the above problems, for example, an inverter control device is disclosed in Japanese Patent Application Laid-open No. 63-228971 (1988). The control device is briefly described hereinunder in accordance with FIGS. 3 and 4. Though a control circuit for three phases is shown in FIG. 3, one with only a U phase is described here in order to simplify the description.

In FIG. 3, the control device comprises a direct current source 1, an inverter main circuit 2 having arms 2U, 2V and 2W, an induction motor 3 as a load, an output frequency setter 4, a three-phase sinewave generator circuit 5, comparators 6U, 6V and 6W, a triangular wave generator circuit 7, a synchronizing signal generator circuit 8, delay circuits 9U, 10U and 11U, a logic circuit 12U, a change-over circuit 13U, a phase detector circuit 14, and a current detector circuit 15.

There is described operation of a device, as shown in FIG. 4, in the case of supposing that the short-circuit preventing duration $T_d$ comprises a delay time $T_{d1}$ of the switching elements turned off, and a float time $T_{d2}$ corresponding to a dispersion which is generated in circuit planning.

The delay circuit 9U delays a reference switching signal A1U from the comparator 6U for the time $T_{d1}$ to generate a signal A2U. In the same way, the delay circuit 10U delays the signal A2U for the time $T_{d1}$ to generate a signal A3U, and the delay circuit 11U delays the signal A3U for the time $T_{d2}$ to generate a signal A4U. The logic circuit 12U receives the signals A1U, A2U, A3U and A4U and makes a driving signal U(B+) for the positive switching element by calculating a logical product "A2U*A3U" and a driving signal U(B−) for the negative switching element by calculating a logical product "A1U*A4U" to use them for an X mode when the output current flows in the positive direction, so as to output a control signal XU on the basis of the driving signals U(B+) and U(B−). Furthermore, the logic circuit 12U makes a driving U(B+) for the positive switching element by calculating a logical product "A1U*A4U" and a driving signal U(B−) for the negative switching element by calculating a logical product "A2U*A3U" to use them for a Y mode when the output current flows in the positive direction, so as to output a control signal YU on the basis of the driving signals U(B+) and U(B−). FIG. 4 shows only the X mode.

The change-over circuit 13U alternately outputs driving signals U and $\overline{U}$ responsive to a mode change-over signal MU by alternately selecting the control signals XU and YU. The phase detector 14 generates the mode change-over signal MU for changing over the modes X and Y on the basis of data about the output phase of the inverter and data representing a zero cross point of the U phase current supplied from the current detector 15.

In this case, a transistor U of positive side of the U phase arm is turned on during the same time of the reference switching signal A1U when the transistor U actually delays to be turned off for the time $T_{d1}$ from the driving signal U(B+), thereby changing an output voltage $V_{u-0}$ according thereto. On the other hand, the driving signal U(B−) supplied to the transistor $\overline{U}$ of the negative side of the $\overline{U}$ phase arm is turned on to be delayed for a period $(T_{d1}+T_{d2})$ after the driving signal U(B+) supplied to the transistor U is turned off, thereby completely preventing the possibility of the short-circuiting of the arm. Though the detailed description is omitted, the same control is performed for the Y mode as for the X mode.

As a result, although the short-circuit preventing duration is provided for the main circuit arm, it is possible to sufficiently suppress the voltage drop and waveform distortion, so that it is possible to smoothly control the inverter without the torque changing and noises even if the control device is applied to the motor driving.

If central processing units (CPU) have the same function as the aforementioned control device, it is possible to greatly simplify the construction of the control device. However, if the entire functions of the conventional devices including an assignment of the control modes are realized, the processing amount becomes extremely large, so that the conventional device has the problem of being impossible to be realized by digital methods.

SUMMARY OF THE INVENTION

In order to solve the above problem, an object of the present invention is to provide a control system for an inverter, which is capable of suppressing influences by providing a sufficiently lower short-circuit preventing duration.

A system for controlling an inverter according to the present invention comprises means for detecting a zero-cross point of an alternating current having three phase, means for generating a PWM wave which changes a level thereof responsive to the turning on and off of switching elements and inverted to each other in the positive and negative sides at every main circuit arm, an on-delay circuit for delaying a level change timing of the PWM from OFF to ON for a short-circuit preventing duration, and means for compensating a pulse width by doubly expanding and/or contracting a width of the PWM wave of one phase in which a current having the opposite polarity of the other two phases and adding the expanded and/or contracted wave to the on-delay circuit on the basis of the zero-cross point. The system controls the switching elements by an output of the on-delay circuit.

In a PWM inverter, if a carrier frequency becomes higher, an impulse occurs by providing the short-circuit prevention duration, as shown in FIG. 8. To facilitate viewing, a width of each impulse is represented in magnified fashion. Though the impulses respectively belong to each carrier cycle, a total waveform corresponds to the superposition of the extra rectangular wave voltage as shown by a dotted line in FIG. 4 to the output voltage. The rectangular wave voltage becomes a negative value while an instantaneous value $i_u$ of an output current $I_U$ becomes a positive value. On the contrary, The voltage becomes a positive value while the instantaneous value becomes a negative value.

When a lack of the voltage pulses having a width of one $T_d$ per each carrier cycle is represented by "−", and when the remainder of the voltage pulses is represented by "+", the lack and remainder are shown in FIG. 9 corresponding to the change of alternating currents $i_u$, $i_v$ and $i_w$ of three phases. Namely, because the voltage pulses of one $T_d$ width lacks in U and W phases during 0 to 60 degrees, the lack is represented by "− −", while as the voltage pulse of one $T_d$ width remains in the V phase, the remainder is represented by "+". Furthermore, during the period from 60 to 120 degrees, as the voltage pulses having one $T_d$ width remains respectively in the V and W phases, the remainder is represented by "+ +", respectively, while as the voltage pulse having one $T_d$ width lacks in the U phase, the lack is represented by "−". The same "lack" and "remainder" of the voltage pulses are regularly generated at every 60 degrees in sequence.

The influence of the lack and remainder of the pulse of the voltage is eliminated, for example, by adding and subtracting impulse trains as shown in FIG. 10, to and from the voltage pulse. The addition and subtraction correspond to the expansion and contraction, respectively. However, if the impulse trains are added and subtracted at every phase, the processing amount can be reduced only slightly.

Fortunately, a vectorially subtracted value of each phase U, V or W is added as a line voltage to the load in the three phase alternating current. Accordingly, even if the voltage pulses lack or remain in all three phases, the lack or remainder does not influence the line voltage, thereby suppressing the waveform distortion lower.

Therefore, if the voltage pulses having two $T_d$ width are actively subtracted from the voltage of the V phase during the period from 0 to 60 degrees under the condition that the voltage pulses in the U and W phases lack as they are, the influence of the short-circuit preventing duration $T_d$ in the V phase is "−" as shown in FIG. 11, so that the voltage pulses of all three phases lack.

During a period from 60 to 120 degrees, if the pulses having two $T_d$ widths are actively added to the voltage of the U phase, the influence of the short-circuit preventing duration $T_d$ in the U phase is "+" as shown in FIG. 11, so that the pulses of all three phases remain. As a result, if a PWM wave width of one phase in which the current having opposite polarity to other two phases flows, is expanded and contracted by two $T_d$ in the direction that the absolute value of the voltage becomes larger at every 60 degrees of the electric angle, a drop of the line voltage and waveform distortion can be suppressed by only a small processing amount.

With this point of view, as the system of the present invention comprises the compensation means of the pulse width for expanding and contracting the PWM wave width of one phase in which the current opposite polarity to other two phases flows in a rate of twice as long or short as the short-circuit preventing duration and for adding the expanded or contracted PWM wave width to the on-delay circuit, this invention has an effect that it is possible to sufficiently suppress the influence of providing the short-circuit prevention duration by a digital method.

BRIEF DESCRIPTION OF THE DRAWINGS

In the accompanying drawings:

FIGS. 1(a) and 1(b) are circuit diagrams for explaining an influence of a short-circuit preventing duration of the general PWM inverters, respectively;

FIG. 2 is a waveform diagram for explaining an influence of the short-circuit duration of the inverter;

FIGS. 7(a) and 7(b) are waveform diagrams for comparing the operations of the embodiment shown in FIG. 5 with the conventional device.

DETAILED DESCRIPTION OF THE PREFERRED EMBODIMENT

Figure 3:
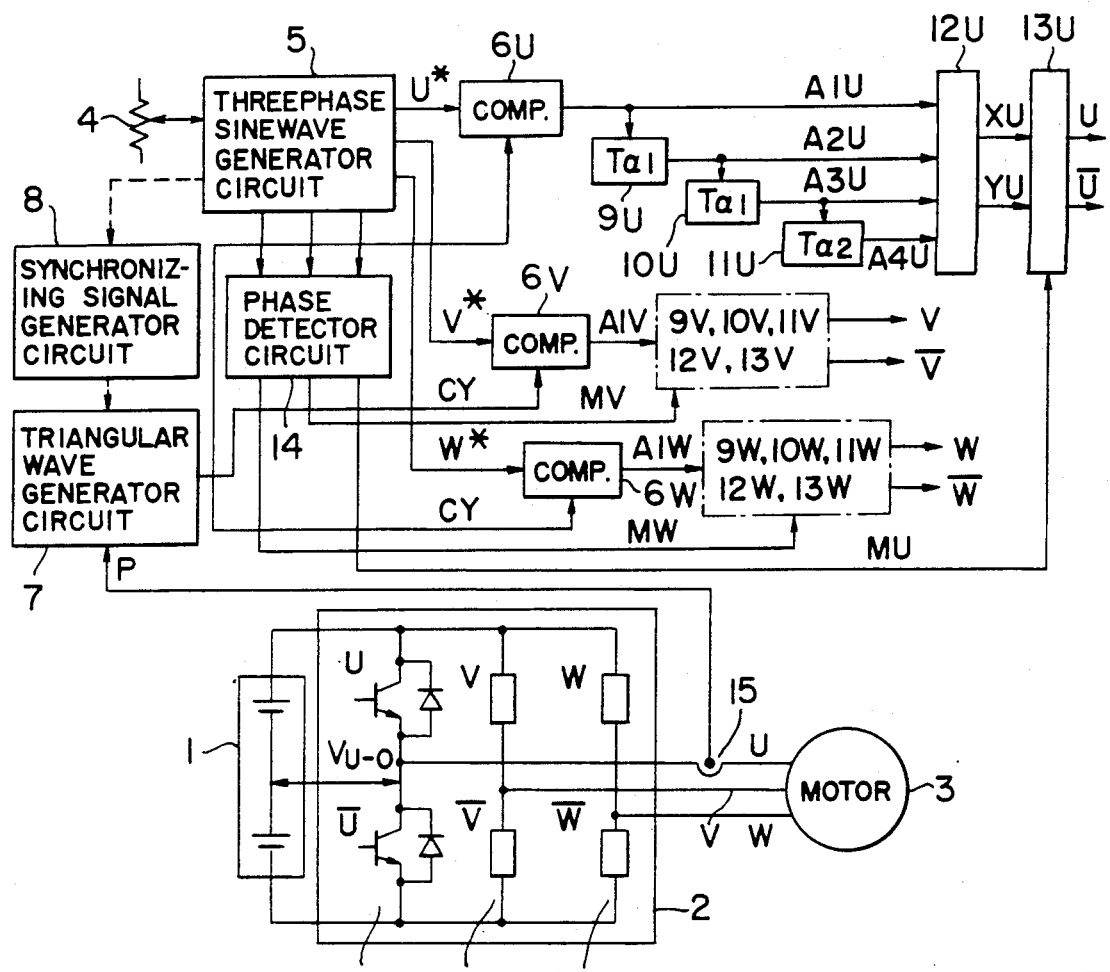
FIG. 3 is a block diagram showing a configuration of a conventional control device for the inverter.
Figure 4:
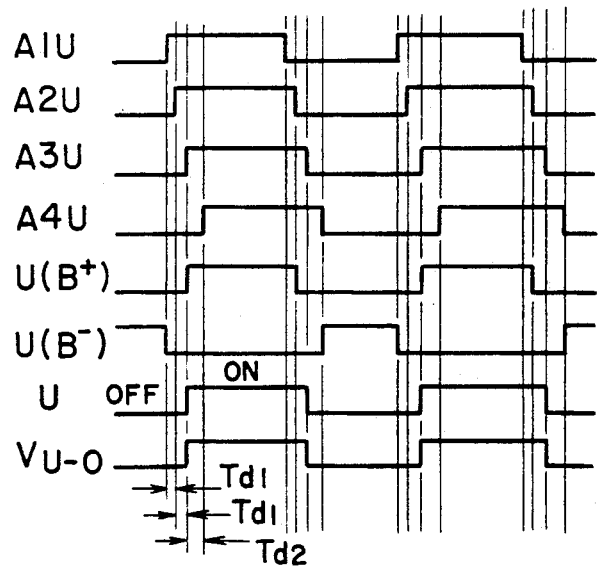
FIG. 4 is a waveform diagram for explaining the operation of the device shown in FIG. 3.
Figure 5:
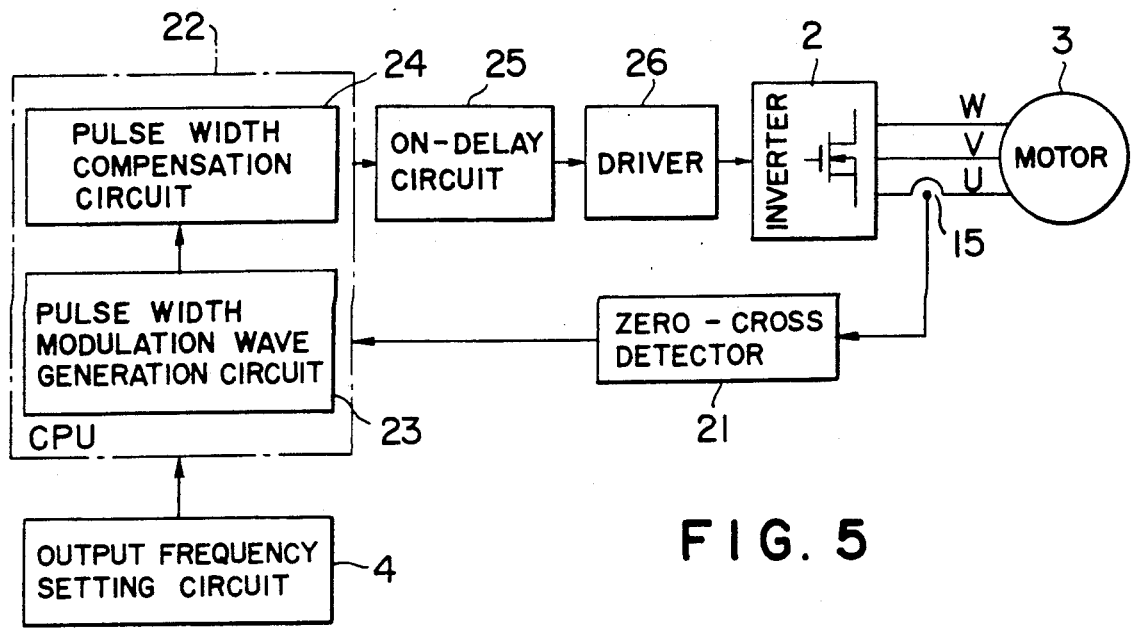
FIG. 5 is a block diagram showing a control system for an inverter according to an embodiment of the present invention.

FIG. 5 shows a configuration of an embodiment of the present invention. The duplicate explanation will be omitted by using the same numerals in FIG. 5 as those of FIG. 3.

In the figure, a control system comprises a zero-cross detector 21 for detecting a zero-cross point of the U phase on the basis of an output of the current detector 15, a central processing unit (abbreviated to CPU hereinafter) 22 having a PWM wave generation circuit 23 and a pulse width compensation circuit 24, an on-delay circuit 25 connected to the CPU 22, and a driver circuit 26 for turning on or off each switching element of the inverter main circuit 2 on the basis of an output of the on-delay circuit 25. In the CPU 22, the circuit 23 generates a pulse width modulated wave by using software, and the circuit 24 sequentially compensates the pulse width of one phase of the generated PWM wave. The on-delay circuit 25 is a known circuit and causes a timing from "ON" to "OFF" state of the inverter 2 to delay in the short-circuit preventing duration.

Figure 6:
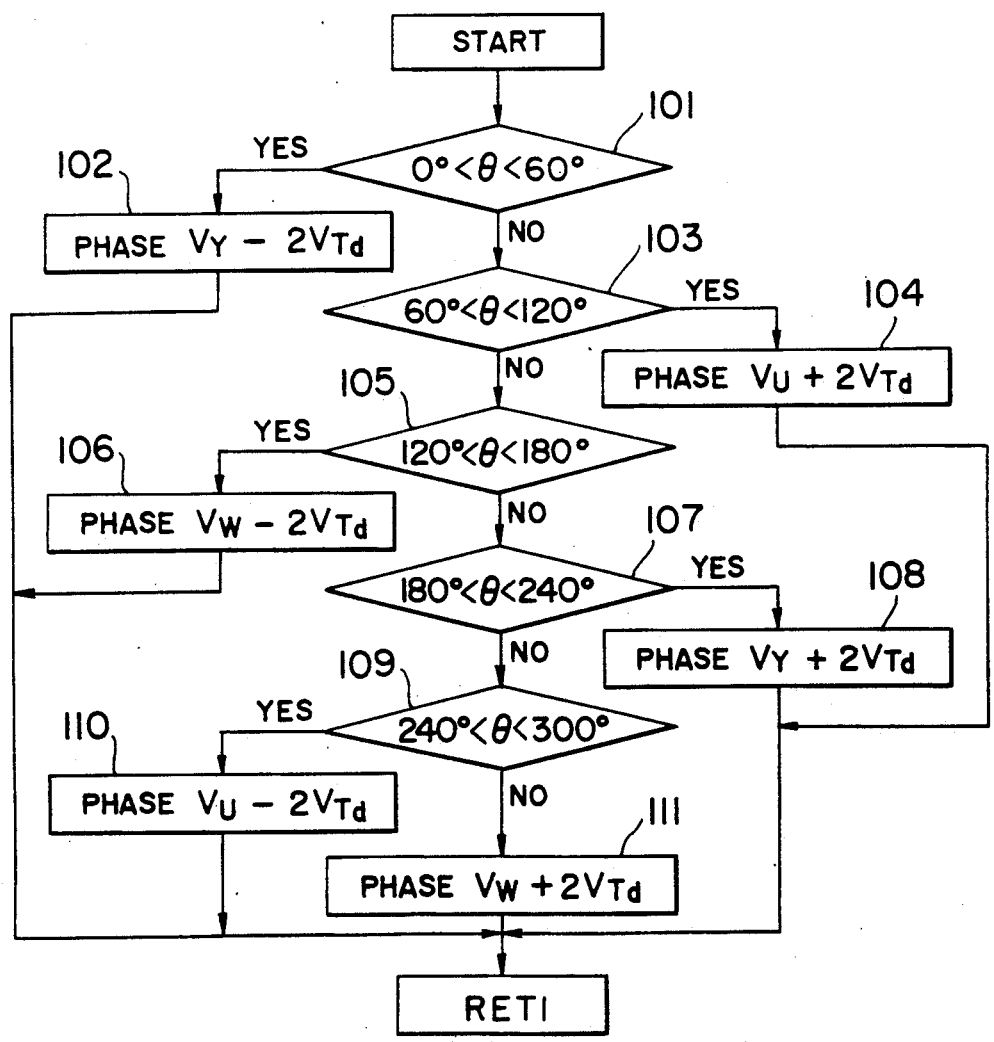
FIG. 6 is a flow chart for explaining the operation of the control system shown in FIG. 5.
Figure 8:
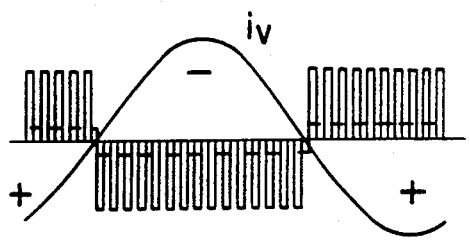
FIGS. 8 to 11 are waveform diagrams for explaining a principle of the present invention, respectively.
Figure 9:
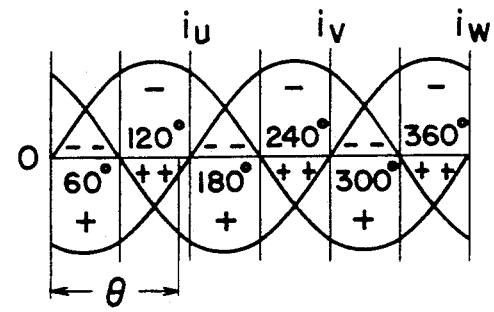
Figure 10:
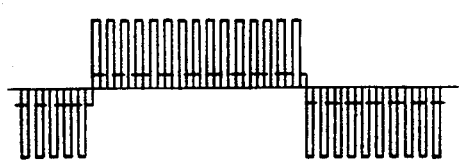

There will be described hereinunder the operation of the control system according to the embodiment having the above configuration with reference to a flow chart shown in FIG. 6.

First, the current detector 15 detects a U phase current output from the inverter main circuit 2. The zero-cross detector 21 detects the zero-cross point of the U phase current and interrupts the CPU 22. The CPU 22 generates the PWM wave as shown in FIG. 2 corresponding to three arms on the basis of a set value by the output frequency setter 4. As detailed operation has almost been proposed and known, a description thereof is omitted.

On the other hand, the circuit 24 calculates a power factor angle α and a current phase θ on the basis of the PWM wave and zero-cross point. As shown in the flow chart of FIG. 6, processing is performed corresponding to the current phase θ. Namely, when the current phase θ is determined to be in the region from 0 to 60 degree in step 101, the PWM wave width of the V phase is expanded and contracted in two $T_d$—a positive side is contracted while a negative side is expanded—, thereby eliminating a voltage unbalanced component in step 102. Furthermore, when the current phase is determined to be in the region from 60 to 120 degrees in step 103, the PWM wave width of the U phase is expanded and contracted in two $T_d$—a positive side is expanded while a negative side is contracted—, thereby eliminating a voltage unbalanced component in step 104. The same processing is carried out for every 60 degrees of the current phase angle in steps 105 to 111. After that, the same processing is repeated.

Figure 11:
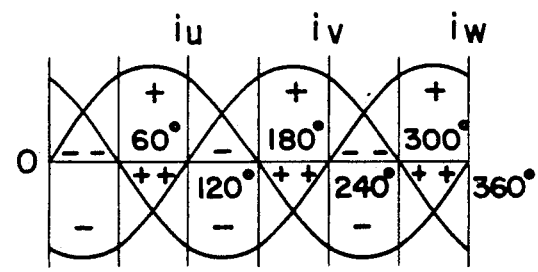

As a result, the phase voltage is compensated every 60 degrees, as shown in FIG. 11, thereby eliminating adverse influence by the short-circuit preventing duration.

FIG. 7(a) shows the Output current waveforms respectively at 0.5, 5 and 20 Hz when an active countermeasure to influence by the short-circuit preventing duration is not consider 7(b) shows the output current waveforms respectively at 0.5, 5 and 20 Hz according to the embodiment of the present invention. As is clearly understood from these figures, this embodiment is capable of making the current waveform coincide with a sinewave, irrespective of an output frequency.

Furthermore, it is sufficient for this embodiment to provide a current detector for only one phase. Moreover, if the current detector is only used in the detection of a zero-cross point, it is possible to miniaturize a current transformer (CT) by using the saturation type in the case that the CT is used.

Still furthermore, as it is unnecessary for this embodiment to simultaneously compensate the PWM waves of the three phases, even though the carrier has a high frequency, it is possible to eliminate the problem of conventional devices, for example, in that the data processing of the CPU is not in time.

As described above, the present invention has the effect that it is possible to sufficiently suppress an influence by providing the short-circuit preventing duration by using digital software, because the system of this invention comprises the pulse width compensation means for expanding and contracting the PWM wave width of one phase in which the opposite polarity current of other two phases flows twice as the prevention duration.

What is claimed is:

1. A system for controlling a PWM inverter, comprising:
   means for detecting a zero-crossing point of any individual phase of a three phase alternating current;
   means for generating a PWM wave which has a level which changes responsive to switching elements turning on and off and which is inverted in the positive and negative sides at every main circuit arm;
   an on-delay circuit means for delaying a level change timing of the PWM wave from turning off to on for a short-circuit preventing duration; and
   compensation means for compensating a pulse width of said PWM wave by expanding and contracting the width of the PWM wave of one phase in which a current having a polarity of the other two phases flows for two times as the short-circuit preventing duration, and by adding the expanded and contracted waves to said on-delay circuit means on the basis of the detected zero-crossing point;
   wherein said compensation means compensates said pulse width by addition or subtraction of a predetermined pulse width corresponding to said short-circuit preventing duration at every 60 degrees and said addition or subtraction is performed in different phases in sequence at every 60 degrees.

2. A system according to claim 1, wherein said PWM generation means and said compensation means are provided in a central processing unit.

3. A system according to claim 1, wherein said inverter comprises three main circuit arms which have switching elements of positive and negative sides and free wheel diodes connected in parallel to said switching elements, so that a voltage of a direct current is supplied to both ends of said arms and said inverter takes a three phase alternating current out of an intermediate portion of said arms by controlling the switching elements to turn on and off.

* * * * *